(12) United States Patent
Bruinsma et al.

(10) Patent No.: US 8,777,390 B2
(45) Date of Patent: Jul. 15, 2014

(54) INK-JET PRINTING SYSTEM WITH REDUCED NOZZLE CLOGGING

(75) Inventors: Paul Bruinsma, San Diego, CA (US); Dennis P. Parazak, Oceanside, CA (US); Lidia Calvo Garcia, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 65 days.

(21) Appl. No.: 10/825,736

(22) Filed: Apr. 15, 2004

(65) Prior Publication Data

US 2005/0231573 A1 Oct. 20, 2005

(51) Int. Cl.
*C09D 11/00* (2014.01)

(52) U.S. Cl.
CPC ............................... *C09D 11/30* (2013.01)
USPC ........................................................ 347/100

(58) Field of Classification Search
USPC ........................................................ 347/100
See application file for complete search history.

(56) References Cited

U.S. PATENT DOCUMENTS

| | | | | |
|---|---|---|---|---|
| 4,281,999 | A | * | 8/1981 | Becker et al. ...................... 8/527 |
| 4,694,302 | A | | 9/1987 | Hackleman et al. |
| 5,549,740 | A | | 8/1996 | Takahashi et al. |
| 5,624,484 | A | * | 4/1997 | Takahashi et al. .......... 106/31.75 |
| 5,764,263 | A | * | 6/1998 | Lin ............................... 347/101 |
| 5,958,121 | A | * | 9/1999 | Lin ............................ 106/31.43 |
| 6,071,334 | A | | 6/2000 | Wider et al. |
| 6,284,004 | B1 | * | 9/2001 | Burglin et al. ..................... 8/466 |
| 6,328,413 | B1 | * | 12/2001 | Rutland et al. .................. 347/35 |

FOREIGN PATENT DOCUMENTS

| | | |
|---|---|---|
| EP | 1 099 732 A1 | 5/2001 |
| EP | 1 167 046 A1 | 1/2002 |
| EP | 1 243 435 A1 | 9/2002 |
| JP | 11-105408 A | 4/1999 |

* cited by examiner

*Primary Examiner* — Laura Martin

(57) ABSTRACT

A fluid dispensing system for ink-jet printing can comprise an ink-jet ink including anionic dye colorant and from 0.05 wt % to 1.0 wt % of an anionic dispersant polymer, and a fixer composition including a cationic crashing agent that is with a component of the ink-jet ink. The fixer composition can be stored separately from the ink-jet ink, and the fluid dispensing system can be configured for overprinting or underprinting the fixer composition with respect to the ink-jet ink.

28 Claims, No Drawings

INK-JET PRINTING SYSTEM WITH REDUCED NOZZLE CLOGGING

FIELD OF THE INVENTION

The present invention relates generally to ink-jet imaging. More particularly, the present invention relates to ink-jet imaging using an ink-jet ink and a fixer composition with reduced nozzle clogging due to cross-contamination.

BACKGROUND OF THE INVENTION

In order to improve bleed, feathering, waterfastness, and general image quality, ink-jet ink printing systems that include an ink-jet ink and a fixer composition have been prepared. With these systems, though the fixer and ink can work together to improve imaging results, undesirable cross-contamination can occur by one of several mechanisms. Commonly, the migration of aerosol droplets from a fixer composition that is jetted from an ink-jet pen can cross-contaminate ink-jet pen nozzles. Undesired aerosols are typically formed when ejected drops break up into one or two primary droplets, and/or smaller satellite droplets such as those resulting from the tail of the ejected drops becoming separated. A portion of this undesired aerosol from a jetted fixer composition can land on the nozzle plate of the ink-jet pen. Once on the nozzle plate of the ink-jet ink pen, the fixer composition can react with residual ink-jet ink, or can be pulled into the interior of the pen through idle nozzles by the force of backpressure. Thus, the cationic crashing agent in the fixer formulation can react or precipitate with the anionic dye of the ink-jet ink either on the nozzle plate or in the interior of the pen capillaries. Over time, loose agglomerates of precipitate particles may condense into larger, more compact particles that can block nozzles and ink channels within the ink-jet print head. This condensation of loose agglomerates can be exacerbated with elevated temperatures commonly present in thermal print heads. Alternatively, cross-contamination can occur due to mechanical cleaning or wiping mechanisms, or can occur due to migration of fixer composition along a common nozzle plate shared by ink-jet nozzles and fixer composition printing nozzles. As such, it would be useful to provide a solution that would lessen nozzle clogging due to cross-contamination.

SUMMARY OF THE INVENTION

It has been recognized that it would be advantageous to provide fixer and ink printing systems that are effective with respect to durability, bleed and feather reduction, and waterfastness, while reducing susceptibility to nozzle clogging that can occur due to cross-contamination in ink-jet printing systems. Specifically, a fluid dispensing system for ink-jet printing can comprise an ink-jet ink including anionic dye colorant and from 0.05 wt % to 1.0 wt % of an anionic dispersant polymer, and a fixer composition including a cationic crashing agent that is reactive with a component of the ink-jet ink. The fixer composition can be stored separately from the ink-jet ink, and the fluid dispensing system can be configured for overprinting or underprinting the fixer composition with respect to the ink-jet ink.

In another embodiment, a method of ink-jet imaging can comprise steps of jetting an ink-jet ink from ink-jet printing nozzles, and jetting a fixer composition from fixer printing nozzles. The fixer composition can be overprinted or underprinted with respect to the ink-jet ink. Additionally, the ink-jet ink can include an anionic dye colorant and from 0.05 wt % to 1.0 wt % of an anionic dispersant polymer, and the fixer composition can include a cationic crashing agent reactive with a component of the ink-jet ink.

Additional features and advantages of the invention will be apparent from the detailed description which illustrates, by way of example, features of the invention.

DETAILED DESCRIPTION OF THE PREFERRED EMBODIMENT(S)

Before particular embodiments of the present invention are disclosed and described, it is to be understood that this invention is not limited to the particular process and materials disclosed herein as such may vary to some degree. It is also to be understood that the terminology used herein is used for the purpose of describing particular embodiments only and is not intended to be limiting, as the scope of the present invention will be defined only by the appended claims and equivalents thereof.

In describing and claiming the present invention, the following terminology will be used.

The singular forms "a," "an," and "the" include plural referents unless the context clearly dictates otherwise. Thus, for example, reference to "a dye" includes reference to one or more of such materials.

As used herein, "liquid vehicle" is defined to include liquid compositions that can be used to carry colorants or crashing agents to a substrate. Liquid vehicles are well known in the art, and a wide variety of ink vehicles may be used in accordance with embodiments of the present invention. Such ink vehicles may include a mixture of a variety of different agents, including without limitation, surfactants, solvents, co-solvents, buffers, biocides, viscosity modifiers, sequestering agents, stabilizing agents, and water. The liquid vehicle can also carry other additives such as latex particulates, polymers, and the like.

An "ink" or "ink-jet ink" refers to a solution composition that can comprise a liquid vehicle and a colorant. The liquid vehicle can be configured to be stable with the colorant through a broad range of solution and/or dispersion characteristics, and can be configured for ink-jet printing. In accordance with embodiments of the present invention, the colorant can be an anionic dye, and is present primarily for providing color to the ink-jet ink. Additionally, an anionic dispersant polymer can be present in the ink-jet ink.

A "fixing fluid" or "fixer composition" refers to a solution composition that comprises a liquid vehicle and a "crashing agent." The liquid vehicle combined with the crashing agent can be configured to be chemically stable, and can be configured for ink-jet printing. The crashing agent can be a cationic polymer, a multivalent metal ion or ionic group, and/or an acid. The crashing agent is typically configured to precipitate with at least one compositional component of an associated ink-jet ink (to be overprinted or underprinted printed on a substrate therewith). The compositional component that precipitates with the crashing agent can be an anionic dye or a surfactant, for example.

The term "crashing agent" refers to any single chemical or combination of chemicals in a fixer composition that can facilitate the desolubilization or precipitation of one or more component(s) of an ink-jet ink. Precipitation of the anionic dye can impact the waterfastness of the ink-jet image. Precipitation of non-colorants, such as anionic surfactants, can provide advantages in bleed control. The desolubilizing can be accomplished by proton transfer from collision or close proximity of the crashing agent with the colorant and/or another ink-jet ink component, or alternatively, the desolubilizing can be accomplished by component associations induced by the crashing agent and/or component associations occurring with the crashing agent. Other crashing or reaction mechanisms can also occur.

The terms "overprinting" and "underprinting" refer to processes of printing where a first printing solution is printed onto a substrate, and subsequently, a second printing solution is printed onto the first printed solution. The first printing solution would be said to be underprinted with respect to the second printing solution. The second printing solution would be said to be overprinted with respect to the first printing solution. For example, in some embodiments, an ink can be printed onto a media substrate, and then, a fixing fluid can be printed onto the ink. In this example, the fixing fluid is overprinted with respect to the ink. Alternatively, a fixing fluid can be printed onto a media substrate, and then, an ink can be printed onto the fixing fluid. In this latter example, the fixing fluid is underprinted with respect to the ink. Additionally, simultaneous printing of two fluids is also within the definition of overprinting and/or underprinting, as simultaneously applied multiple drops of fluid during a jetting process will provide both overprinting and underprinting of either fluid with respect to the other.

It is to be understood that when referring to printing or jetting an ink-jet ink or fixing fluid "on" or "onto" a media substrate, embodiments wherein both underprinting and overprinting with respect to the ink or fluid printed "on" the media substrate are included. For example, if an ink-jet ink is said to be configured for printing "on" a media substrate, and a fixing fluid is said to be configured for being underprinted with respect to the ink-jet ink, then technically, the ink-jet ink is printed on the fixing fluid (which is printed on the media substrate). In this example, the ink-jet ink would still be defined as being configured for printing on the media substrate. In other words, the presence of an intervening underprinted layer between the ink-jet ink and the porous media substrate does not deter from the fact that the ink-jet ink is configured for printing on the media substrate. This same distinction is also true with respect to related methods. For example, the description of method steps wherein ink-jet ink and a fixing fluid are printed onto a media substrate does not infer that one cannot be overprinted or underprinted with respect to the other.

The term "nozzles" can mean either a single nozzle opening or a plurality of nozzle openings used to jet fluids, e.g., ink-jet inks or fixer compositions. For example, when referring to the clogging of nozzles, the clogging of a single nozzle, the clogging of some nozzles, or the clogging of all nozzles is included. Typically, a print head for jetting a fluid includes many individual nozzles, and the clogging of even a few nozzles can reduce the performance of the print head.

As used herein, "bleed" refers to the tendency of ink to run into and mix with adjacently printed inks. Bleed typically occurs prior to adjacently printed inks fully drying on a substrate. The degree of bleed will depend on a variety of factors such as the drying speed of the ink, ink chemistry, i.e. the presence of reactive or non-reactive bleed control mechanisms, and type of substrate, among other variables. For example, if printing on coated offset media or another smooth surface media, as these media types typically do not allow for rapid penetration of typical ink-jet inks, optionally, a fixer composition can be used to prevent bleed and/or coalescence. Similarly, the term "feathering" refers to rough edges that occur at the interface between a printed image and an unprinted portion of the substrate. Both of these characteristics are typically undesirable.

As used herein, "waterfastness" refers to an inks exhibited degree of water resistance after printing on a substrate. Typically, this property is measured after the ink has dried, and measures the tendency of the ink to smear or otherwise change location in the presence of moisture.

The term "substantially" when used with another term shall include from mostly to completely.

Ratios, concentrations, amounts, molecular sizes, and other numerical data can be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight range of about 1 wt % to about 20 wt % should be interpreted to include not only the explicitly recited concentration limits of 1 wt % to about 20 wt %, but also to include individual concentrations such as 2 wt %, 3 wt %, 4 wt %, and sub-ranges such as 5 wt % to 15 wt %, 10 wt % to 20 wt %, etc.

In accordance with the present invention, a fluid dispensing system for ink-jet printing can comprise an ink-jet ink including anionic dye colorant and from 0.05 wt % to 1.0 wt % of an anionic dispersant polymer, and a fixer composition including a cationic crashing agent that is reactive with a component of the ink-jet ink, e.g., anionic dye or surfactant, etc. Further, the fixer composition can be stored separately from the ink-jet ink, and the fluid dispensing system can be configured for overprinting or underprinting the fixer composition with respect to the ink-jet ink. In one embodiment, the dispensing system can further include ink-jet ink printing nozzles and fixer printing nozzles, wherein the ink-jet printing nozzles are susceptible to cross-contamination by the fixer composition. The affects of this cross-contamination can be alleviated by the presence of the anionic dispersant, provided it is present in an amount that inhibits crashing from occurring at the ink-jet ink printing nozzles.

In an alternative embodiment, a method of ink-jet imaging can comprise steps of jetting an ink-jet ink from ink-jet printing nozzles, and jetting fixer composition from fixer printing nozzles, wherein the fixer composition is overprinted or underprinted with respect to the ink-jet ink after jetting. The ink-jet ink can include an anionic dye colorant and from 0.05 wt % to 1.0 wt % of an anionic dispersant polymer, and the fixer composition can include a cationic crashing agent reactive with a component of the ink-jet ink, e.g., the anionic dye, surfactant, etc. In one embodiment, the ink-jet printing nozzles can be susceptible to cross-contamination by the fixer composition, and the anionic dispersant can be present in the ink-jet ink at an amount that inhibits crashing from occurring at the ink-jet ink printing nozzles.

With respect to both the systems and methods described herein, the ink-jet ink and the fixer composition can be present in two separate ink-jet pens, or alternatively, can be present in two separate reservoirs of a common ink-jet pen. In these embodiments, there are various ways that cross-contamination can occur between the ink-jet ink printing nozzles and fixer composition. For example, the ink-jet printing nozzles and the fixer printing nozzles can be present on a common nozzle plate, thereby resulting in the ink-jet printing nozzles being susceptible to cross-contamination by the fixer composition due to fluid migration along the nozzle plate surface. Alternatively, the ink-jet printing nozzles and the fixer printing nozzles can be configured at a proximity such that, upon jetting, small amounts of fixer composition aerosol jetted from the fixer printing nozzles can contact the ink-jet ink printing nozzles, thereby resulting in the ink-jet printing nozzles being susceptible to cross-contamination by the fixer composition. In another configuration, the ink-jet printing nozzles and the fixer printing nozzles can be serviced by a common wiper, thereby resulting in the ink-jet printing nozzles being susceptible to cross-contamination by the fixer composition.

Ink-Jet Ink Composition

As described, the ink-jet ink composition can include an anionic dispersant polymer, an anionic dye, and a liquid vehicle. Such an ink-jet ink works well at reducing nozzle clogging that can occur in systems that utilize a fixer composition with a cationic crashing agent.

With specific reference to the anionic dispersant polymer, it has been demonstrated that in a system where cross-contamination occurs between a fixer composition (containing a cationic crashing agent) and an ink-jet ink (containing an anionic dye), reduction in clogging of nozzles can be achieved. Without being bound by any particular theory, it is believed that the presence of an anionic dispersant polymer in the ink-jet ink can reattach to undesired anionic dye/cationic crashing agent precipitate through a combination of coulombic interactions between the anionic dispersant polymer and the cationic polymer. If the anionic dispersant polymer also includes a hydrophobic group, it is believed that hydrophobic interactions between the hydrophobic portions of the precipitate and those of the dispersant can also play a role in reducing nozzle clogging as well. Thus, in either embodiment, by adding anionic dispersant polymer to an anionic dye-containing ink-jet ink, a greater amount of a more fully dispersed plurality of negative charges is present throughout the ink-jet ink.

This solution is workable because only a very small amount of cationic crashing agent will typically become cross-contaminated at the ink-jet printing nozzles. Thus, a greater number of more fully dispersed negative charges in the ink-jet ink can provide more spatially dispersed negative charges, as well as a more favorable ratio of negative charge to positive charge at the ink-jet printing nozzles. Because the precipitate is more dispersed, it is less likely to clog the nozzles of the ink-jet ink and be ejected without causing further problems. Whatever the mechanism that provides for cross-contamination, added amounts of anionic dispersant polymer in the ink-jet ink can reduce the amount of clogging that may occur at the ink-jet ink printing nozzles.

In one embodiment, the anionic dispersant polymer can be of sufficient molecular weight to have extra charge that is not associated with a precipitate that can form between an anionic dye of the ink-jet ink and a crashing agent of the fixer composition that has cross-contaminated the ink-jet ink nozzles. Such a larger molecular weight can help prevent the precipitate from condensing into a more compact precipitate that would further block the nozzles in the ink-jet pen. Exemplary molecular weights that can be used can be from 4,000 Mw to 50,000 Mw.

To provide an exemplary embodiment of an anionic dispersant that is useful, a random copolymer of maleic anhydride and 1-octadecene can be used. In one embodiment, the maleic anhydride/1-octadecene copolymer can have a molar ratio of about 1:1 with a molecular weight range of 10,000 to 20,000. Other copolymers that include both hydrophobic and anionic groups can also be used. In one embodiment, if a copolymer is used that includes two copolymerized monomers, the molar ratio can be from 1:2 to 2:1. Exemplary monomers that impart an anionic charge include maleic anhydride, acrylic acid, vinyl sulfonic acid, and styrene sulfonic acid. Monomers that contribute to hydrophobic interaction include styrene, 1-dodecene, 1-tetradecene, 1-hexadecene, 1-octadecene, and vinyl laurate. If a monomer is used that imparts hydrophilic characteristics, exemplary monomers include ethylene glycol and vinyl alcohol. Hydrophilic monomers, when incorporated, can be present in the polymer to improve water solubility when there is a need to provide balance against hydrophobic groups having poorer solubility. Though not well understood, hydrophilic groups can improve the reliability of ink drop ejection in thermal ink-jet pens beyond the solubility improvement provided by anionic monomers.

Commercially available examples of anionic dispersant polymers that can be used include Acusol 460N, Acusol 445, Acusol 586, all from Rohm and Haas. Acusol 460N has an olefin to maleic acid mole ratio of 1:1 and a MW of 15,000. Acusol 445 is an acrylic acid homopolymer with an $SO_3$ group at one end of acrylic acid homopolymer chain, and has molecular weight of about 4,500 Mw. Acusol 586 is an acrylic acid/sulfonic acid copolymer having a molecular weight of about 4,500.

Though random polymers will function as a dispersant in accordance with embodiments of the present invention, the anionic dispersant polymer can alternatively be a block copolymer, with one block serving to interact with solids formed by precipitation at the location of cross-contamination, i.e., at the nozzles, and the other block serving to impart solubility or dispersability.

As mentioned, anionic dispersant polymer additives can be formulated into thermal ink-jet inks to disperse precipitates and agglomerates, allowing them to be spit out of the nozzles without clogging or building up on the nozzle plate. In other words, the presence of anionic dispersant polymers can provide an increased margin against fixer contamination of the ink-jet pen, thereby preventing the formation of dense precipitates that may clog the nozzles.

Turning to the anionic dyes that can be used with the present invention, preferably the anionic dye can include chromophores having a pendent anionic group. Though any effective amount of dye can be used, preferably, the anionic dye can be present in the ink composition at from 0.1 wt % to 6 wt %. Examples of suitable anionic dyes include a large number of water-soluble acid and direct dyes. Specific examples of anionic dyes include the Pro-Jet series of dyes available from Avecia Ltd., including Pro-Jet Yellow I, Pro-Jet Magenta I, Pro-Jet Cyan I, Pro-Jet Black I, and Pro-Jet Yellow 1; Aminyl Brilliant Red F-B (Sumitomo Chemical Co.); the Duasyn line of "salt-free" dyes available from Hoechst, such as Duasyn Direct Black HEF-SF, Duasyn Black RL-SF, Duasyn Direct Yellow 6G-SF VP216, Duasyn Brilliant Yellow GL-SF VP220, Duasyn Acid Yellow XX-SF VP413, Duasyn Brilliant Red F3B-SF VP218, Duasyn Rhodamine B-SF VP353, Duasyn Direct Turquoise Blue FRL-SF VP368, and Duasyn Acid Blue AE-SF VP344 (Acid Blue 9); mixtures thereof; and the like. Further examples include Tricon Acid Red 52, Tricon Direct Red 227, and Tricon Acid Yellow 17 (Tricon Colors Incorporated), Bernacid Red 2BMN, Pontamine Brilliant Bond Blue A, BASF X-34, Pontamine, Food Black 2, Catodirect Turquoise FBL Supra Conc. (Carolina Color and Chemical), Special Fast Turquoise 8GL Liquid (Mobay Chemical), Intrabond Liquid Turquoise GLL (Crompton and Knowles), Cibracron Brilliant Red 38-A (Aldrich Chemical), Drimarene Brilliant Red X-2B (Pylam, Inc.), Levafix Brilliant Red E-4B (Mobay Chemical), Levafix Brilliant Red E-6BA (Mobay Chemical), Pylam Certified D&C Red #28 (Pylam), Direct Brill Pink B Ground Crude (Crompton & Knowles), Cartasol Yellow GTF Presscake (Sandoz, Inc.), Tartrazine Extra Conc. (FD&C Yellow #5, Acid Yellow 23, Sandoz, Inc.), Catodirect Yellow RL (Carolina Color and Chemical), Cartasol Yellow GTF Liquid Special 110 (Sandoz, Inc.), D&C Yellow #10 (Yellow 3, Tricon), Yellow Shade 16948 (Tricon), Basacid Black X34 (BASF), Carta Black 2GT (Sandoz, Inc.), Neozapon Red 492 (BASF), Orasol Red G (Ciba-Geigy), Direct Brilliant Pink B (Crompton-Knolls), Aizen Spilon Red C-BH (Hodagaya Chemical Company), Kayanol Red 3BL (Nippon Kayaku Company), Levanol Brilliant Red 3BW (Mobay Chemical Company), Levaderm Lemon Yellow (Mobay Chemical Company), Aizen Spilon Yellow C-GNH (Hodagaya Chemical Company), Spirit Fast Yellow 3G, Sirius Supra Yellow GD 167, Cartasol Brilliant Yellow 4GF (Sandoz), Pergasol Yellow CGP (Ciba-Geigy), Orasol Black RL (Ciba-Geigy), Orasol Black RLP (Ciba-Geigy), Savinyl Black RLS (Sandoz), Dermacarbon 2GT (Sandoz), Pyrazol Black BG (ICI Americas), Morfast Black Conc A (Morton-Thiokol), Diazol Black RN Quad (ICI Americas), Orasol Blue GN (Ciba-Geigy), Savinyl Blue GLS (Sandoz, Inc.), Luxol Blue MBSN (Morton-Thiokol), Sevron Blue 5GMF (ICI Americas), and Basacid Blue 750 (BASF); Levafix Brilliant Yellow E-GA, Levafix Yellow E2RA, Levafix Black EB, Levafix Black E-2G, Levafix Black P-36A, Levafix Black PN-L, Levafix Brilliant Red E6BA, and Levafix Brilliant Blue EFFA, all available from Bayer; Procion Turquoise PA, Procion Turquoise HA, Procion Turquoise Ho5G, Procion Turquoise H-7G, Procion Red MX-5B, Procion Red H8B (Reactive Red 31), Procion Red MX 8B GNS, Procion Red G, Procion Yellow MX-8G, Procion Black H-EXL, Procion Black P-N, Procion Blue MX-R, Procion Blue MX-4GD, Procion Blue MX-G, and Procion Blue MX-2GN, all available from ICI Americas; Cibacron Red F-B, Cibacron Black BG, Lanasol Black B, Lanasol Red 5B, Lanasol Red B, and Lanasol Yellow 46, all available from Ciba-Geigy; Baslien Black P-BR, Baslien Yellow EG, Baslien Brilliant Yellow P-3GN, Baslien Yellow M-6GD, Baslien Brilliant Red P-3B, Baslien Scarlet E-2G, Baslien Red E-B, Baslien Red E-7B, Baslien Red M-5B, Baslien Blue E-R, Baslien Brilliant Blue P-3R, Baslien Black P-BR, Baslien Turquoise Blue P-GR, Baslien Turquoise M-2G, Baslien Turquoise E-G, and Baslien Green E-6B, all available from BASF; Sumifix Turquoise Blue G, Sumifix Turquoise Blue H-GF, Sumifix Black B, Sumifix Black H-BG, Sumifix Yellow 2GC, Sumifix Supra Scarlet 2GF, and Sumifix Brilliant Red 5BF, all available from Sumitomo Chemical Company; Intracron Yellow C-8G, Intracron Red C-8B, Intracron Turquoise Blue GE, Intracron Turquoise HA, and Intracron Black RL, all available from Crompton and Knowles, Dyes and Chemicals Division; mixtures thereof, and the like. This list is intended to be merely exemplary, and should not be considered limiting.

Fixer Composition

As described above, fixer compositions can be configured for jetting on a substrate before, after, or simultaneously with the ink-jet ink, such as by overprinting or underprinting with respect to the ink-jet ink. Typically, the fixer composition can be jetted from a separate pen, or from separate jetting nozzles of the same pen, with respect to the ink-jet ink.

Fixer composition can include a liquid vehicle and a crashing agent, and the combination can be configured to be ink-jettable. Though colorant can be present in the fixing fluid, a substantially colorless fixing fluid exemplifies a typical embodiment. The crashing agent can be any crashing agent that acts to crash one or more ink-jet ink component, thereby improving durability and waterfastness of an ink-jet ink image printed on a media substrate. Though any functional amount of crashing agent can be present in the fixing fluid, from about 1 wt % to 5 wt % can be included.

The crashing agent can be a cationic polymer, a multivalent ion or ionic group, or an acid, for example. Many possible crashing agents within these categories, or others, can be used to crash one or more components of the ink-jet ink. For example, if the crashing agent is a cationic polymer, it can be one or more of polyvinylpyridines, polyalkylaminoethyl acrylates, polyalkylaminoethyl methacrylates, poly(vinyl imidazole), polyethyleneimines, polybiguanides, polyguanides, polyvinylamines, polyallylamines, polyacrylamines, polyacrylamides, polyquaternaryamines, cationic polyurathenes, aminecelluloses, and/or polysacchride amines.

If the crashing agent includes a multivalent ion or ionic group, it can be provided by one or more of multivalent metal nitrates (such as aluminum nitrates, calcium nitrates, and magnesium nitrates), EDTA salts, phosphonium halide salts, organic acids, and/or chloride salts. The chloride salt can be, for example, calcium chloride, magnesium chloride, or aluminum chloride.

If the crashing agent is an acid, it can be provided by one or more of succinic acid, glycolic acid, citric acid, nitric acid, hydrochloric acid, phosphoric acid, sulfuric acid, polyacrylic acid, acetic acid, malonic acid, maleic acid, ascorbic acid, glutaric acid, fumaric acid, tartaric acid, lactic acid, nitrous acid, boric acid, carbonic acid, carboxylic acids such as formic acid, chloroacetic acid, dichloroacetic acid, trichloroacetic acid, fluoroacetic acid, trimethylacetic acid, methoxyacetic acid, mercaptoacetic acid, propionic acid, butyric acid, valeric acid, caprioc acid, caprylic acid, capric acid, lauric acid, myristic acid, palmitic acid, stearic acid, oleic acid, rinolic acid, rinoleic acid, cyclohexanecarboxylic acid, phenylacetic acid, benzoic acid, o-toluic acid, m-toluic acid, p-toluic acid, o-chlorobenzoic acid, m-chlorobenzoic acid, p-chlorobenzoic acid, o-bromobenzoic acid, m-bromobenzoic acid, p-bromobenzoic acid, o-nitrobenzoic acid, m-nitrobenzoic acid, p-nitrobenzoic acid, oxalic acid, adipic acid, phthalic acid, isophthalic acid, terephthalic acid, salicylic acid, p-hydrobenzoic acid, anthranilic acid, m-aminobenzoic acid, p-aminobenzoic acid, benzenesulfonic acid, methylbenzenesulfonic acid, ethylbenzenesulfonic acid, dodecylbenzenesulfonic acid, 5-sulfosalicylic acid, 1-sulfonaphthalene, hexanesulfonic acid, octanesulfonic acid, dodecanesulfonic acid, amino acids such as glycine, alanine, valine, α-aminobutyric acid, α-aminobutryic acid, α-alanine, taurine, serine, α-amino-n-caprioc acid, leucine, norleucine, and/or phenylalanine.

Though many possible crashing agents have been listed, certain crashing agents can be more or less preferred for use in certain applications, as would be known by those skilled in the art after considering the present disclosure. For example, calcium nitrate or magnesium nitrate can be used with state of the art ink-jet pens. Though such composition and pen combinations are functional, these compositions can damage these ink-jet pens over time, as well as provide other unfavorable characteristics. Though less preferred, such acidic agents are still within the scope of the present invention. To cite another example, one can consider the dye present in the ink-jet ink composition when selecting an appropriate crashing agent. Certain crashing agents will work better with certain dyes, as would be apparent to one skilled in the art after considering the present disclosure.

The fixer composition is typically used to improve characteristics of image quality and durability. For example, fixer composition can improve waterfastness, while reducing bleed and feathering. The amount of fixer composition used to improve waterfastness can be governed by stoichiometry of the precipitation reaction, and thus, a rule of thumb is that one drop of fixer can be used for each drop of ink. Additionally, it can be beneficial to have fixer drop sizes of about the same size as the smallest colorant drop that will be jetted from the printer.

The stoichiometry of fixer composition to ink-jet ink has to do with performance when printed on a media substrate. However, cross-contamination does not typically occur at the same ratio as that which is printed on the substrate. For example, when a fixer composition cross-contaminates ink-jet ink printing nozzles, there is typically only a very small amount of fixer composition compared to ink-jet ink at the ink-jet ink printing nozzles. However, this small amount of fixer composition can form a precipitate that clogs the nozzles of the ink-jet pen.

Liquid Vehicle

The liquid vehicles and components described herein are applicable with respect to the ink-jet ink and the fixer composition. It is understood that these components are exemplary and do not limit the scope of vehicle components that can be used. In some embodiments of the present invention, it may be favorable for the liquid vehicle to comprise water-soluble organic solvents, co-solvents, and other additives as a liquid medium. The balance of any embodiment formulation can be water, or other vehicle component known in the art.

As described, cosolvents can be included in the ink-jet compositions of the present invention. Suitable cosolvents for use in the present invention include water soluble organic cosolvents, but are not limited to, aliphatic alcohols, aromatic alcohols, diols, glycol ethers, poly(glycol) ethers, lactams, formamides, acetamides, long chain alcohols, ethylene glycol, propylene glycol, diethylene glycols, triethylene glycols, glycerine, dipropylene glycols, glycol butyl ethers, polyethylene glycols, polypropylene glycols, amides, ethers, carboxylic acids, esters, organosulfides, organosulfoxides, sulfones, alcohol derivatives, carbitol, butyl carbitol, cellosolve, ether derivatives, amino alcohols, and ketones. For example, cosolvents can include primary aliphatic alcohols of 30 carbons or less, primary aromatic alcohols of 30 carbons or less, secondary aliphatic alcohols of 30 carbons or less, secondary aromatic alcohols of 30 carbons or less, 1,2-diols of 30 carbons or less, 1,3-diols of 30 carbons or less, 1,5-diols of 30 carbons or less, ethylene glycol alkyl ethers, propylene glycol alkyl ethers, poly(ethylene glycol) alkyl ethers, higher homologs of poly(ethylene glycol) alkyl ethers, poly(propylene glycol) alkyl ethers, higher homologs of poly(propylene glycol) alkyl ethers, lactams, substituted formamides, unsubstituted formamides, substituted acetamides, and unsubstituted acetamides. Specific examples of cosolvents that are preferably employed in the practice of this invention include, but are not limited to, 1,5-pentanediol, 2-pyrrolidone, 2-ethyl-2-hydroxymethyl-1,3-propanediol, diethylene glycol, 3-methoxybutanol, and 1,3-dimethyl-2-imidazolidinone. Cosolvents can be added to reduce the rate of evaporation of water in the ink-jet fluid to minimize clogging or other properties of the ink such as viscosity, pH, surface tension, optical density, and print quality. The cosolvent concentration can range from about 5 wt % to about 50 wt %, and in one embodiment is from about 14 wt % to about 16 wt %. Multiple cosolvents can also be used, as is known in the art.

The liquid vehicle can also comprise solution characteristic modifiers such as viscosity modifiers, pH adjustors, preservatives, various types of surfactant, antioxidants, and evaporation accelerators. Examples of surfactants that can be used include primary, secondary, and tertiary amine salt compounds such as hydrochloric acid salts, acetic acid salts of laurylamine, coconut amine, stearylamine, rosin amine; quaternary ammonium salt type compounds such as lauryltrimethylammonium chloride, cetyltrimethylammonium chloride, benzyltributylammonium chloride, benzalkonium chloride, etc.; pyridinium salt type compounds such as cetylpyridinium chloride, cetylpyridinium bromide, etc.; nonionic surfactant such as polyoxyethylene alkyl ethers, polyoxyethylene alkyl esters, acetylene alcohols, acetylene glycols; and other surfactants such as 2-heptadecenyl-hydroxyethylimidazoline, dihydroxyethylstearylamine, stearyldimethylbetaine, and lauryldihydroxyethylbetaine; and combinations thereof.

pH adjustors that can be used comprise base agents such as sodium hydroxide, lithium hydroxide, sodium carbonate, ammonium carbonate ammonia sodium acetate, ammonium acetate, morpholine, monoethanolamine, diethanolamine, triethanolamine, ethylmonoethanolamine, n-butyldiethanolamine, di-n-butylethanolamine, monoisopropanolamine, diisopropanolamine, and triisopropanolamine, and the like as well as combinations thereof. Additionally, pH adjustors can also comprise acidic agents that can be selected from the list of acidic crashing agents.

Consistent with the formulation of this invention, various other additives can be used to optimize the properties of the ink composition for specific applications. Examples of these additives are those added to inhibit the growth of harmful microorganisms. These additives may be biocides, fungicides, and other microbial agents, which are routinely used in liquid vehicle formulations. Examples of suitable microbial agents include, but are not limited to, Nuosept (Nudex, Inc.), Ucarcide (Union carbide Corp.), Vancide (R.T. Vanderbilt Co.), Proxel (ICI America), and combinations thereof. Sequestering agents, such as EDTA (ethylenediaminetetraaceticacid) and the like, may be included to eliminate the deleterious effects of heavy metal impurities.

In an additional aspect of the present invention, binders can be included which act to secure the colorants on the substrate. Binders suitable for use in the present invention typically have a molecular weight of from about 4,000 Mw to about 18,000 Mw. Non-limiting examples include polyester, polyester-melanine, styrene-acrylic acid copolymers, styrene-acrylic acid-alkyl acrylate copolymers, styrene-maleic acid copolymers, styrene-maleic acid-alkyl acrylate copolymers, styrene-methacrylic acid copolymers, styrene-methacrylic acid-alkyl acrylate copolymers, styrene-maleic half ester copolymers, vinyl naphthalene-acrylic acid copolymers, vinyl naphthalene-maleic acid copolymers, and salts thereof.

Though common principles have been described with respect to the liquid vehicle for ink-jet ink composition and fixer compositions, different liquid vehicles can be formulated for each in a common system. For example, if preparing an anionic pigment-containing ink-jet ink, an anionic or non-ionic surfactant can be used to prevent crashing of the pigment. Alternatively, if preparing a fixer composition containing a cationic crashing agent, then a cationic or nonionic surfactant can be used in the fixer solution. In other words, considerations that would be known to those skilled in the art can be taken when preparing a liquid vehicle for use in accordance with principles of the present invention.

EXAMPLES

The following examples illustrate the embodiments of the invention that are presently best known. However, it is to be understood that the following are only exemplary or illustrative of the application of the principles of the present invention. Numerous modifications and alternative compositions, methods, and systems may be devised by those skilled in the art without departing from the spirit and scope of the present invention. The appended claims are intended to cover such modifications and arrangements. Thus, while the present invention has been described above with particularity, the following Examples provide further detail in connection with what are presently deemed to be the most practical and preferred embodiments of the invention. An anionic dispersant polymer present in the ink-jet ink can be used to reduce these clogging issues, as discussed previously.

Example 1

About 0.6 wt % of an anionic polyacrylate polymer having an olefin to maleic acid mole ratio of 1:1 and a weight average molecular weight of 15,000 Mw, was added to a magenta ink-jet ink containing an anionic dye. A small amount (about 1 wt %) of a cationic polymer-containing fixer solution was added (or "spiked") into the magenta ink-jet ink sample, and the ink-jet ink sample was then aged for 16 hours at 70° C. to simulate aerosol or nozzle plate cross-contamination that often occurs when an ink-jet ink is printed just before or after a fixer composition is printed. An excess of anionic dispersant polymer was present compared to the cationic polymer that would be present in the fixer composition. The anionic dispersant polymer, present in excess, was shown to prevent the agglomeration of the ink-jet ink in the presence of the fixer, and very little precipitation occurred. The small amount of precipitation that did occur was as a loosely aggregated flocculent that would be easily ejected out of ink-jet nozzles. In comparison, the addition of the fixer composition to the same ink-jet ink without the presence of the anionic dispersant polymer produced a condensed solid after being heated to 70° C.

Example 2

A magenta ink-jet ink was prepared that included an anionic magenta dye, a phosphate surfactant known as Crodafos N-3 Acid (which is sensitive to precipitation with trivalent metal salts), and about 0.1 wt % of an anionic acrylic acid homopolymer having an $SO_3$ group at one end of chain and a weight average molecular weight of about 4500 Mw. To the ink-jet ink was added an aqueous aluminum nitrate salt solution to an aluminum concentration of 32 ppm (0.0032 wt %) in the ink. This concentration of aluminum ions in the ink would typically form a precipitant with the phosphate surfactant. However, the presence of the anionic polymer greatly improved the filterability of the ink-jet ink through a 0.25 micron filters, leaving very little filtrate. In comparison, the addition of the aluminum nitrate salt solution to a similar ink-jet ink without the presence of the anionic dispersant polymer produced a precipitant that was substantially unfilterable through the 0.25 micron filters.

Example 3

A magenta ink-jet ink was prepared that included an anionic magenta dye, a phosphate surfactant known as Crodafos N-3 Acid (which is sensitive to precipitation with trivalent metal salts), and about 0.1 wt % of an anionic acrylic acid/sulfonic acid copolymer having a weight average molecular weight of about 4,500 Mw. To the ink-jet ink was added an aqueous aluminum nitrate salt solution to an aluminum concentration of 32 ppm (0.0032 wt %) in the ink. This concentration of aluminum ions in the ink would typically form a precipitant with the phosphate surfactant. However, the presence of the anionic polymer greatly improved the filterability of the ink-jet ink through a 0.25 micron filters, leaving very little filtrate. In comparison, the addition of the aluminum nitrate salt solution to a similar ink-jet ink without the presence of the anionic dispersant polymer produced a precipitant that was substantially unfilterable through the 0.25 micron filters.

Example 4

A magenta ink-jet ink containing an anionic dispersant polymer was print tested in a pen along side a pen containing a cationic fixer. The magenta ink-jet ink-containing pen exhibited no nozzle clogging due to the close proximity to the cationic fixer-containing pen. For comparison purposes, similar test pens filled with magenta ink without the anionic dispersant polymer were also printed in close proximity to a cationic fixer. In this latter test, nozzle clogging occurred with respect to some of the nozzles.

Example 5

Several magenta ink-jet inks were prepared including various amounts of an anionic dispersant polymer. The anionic dispersant polymer used was anionic polyacrylate polymer having an olefin to maleic acid mole ratio of 1:1 and a weight average molecular weight of 15,000 Mw. The range of the amount of anionic polymer dispersant used was from 0 wt % up to 6.4 wt %. Magenta ink-jet inks printed with fixer composition had no loss in waterfastness and little or no loss in optical density within this range of dispersant concentration. However, the various amounts of anionic dispersant polymer altered the agglomeration behavior and decap properties of the ink-jet ink. Good decap results were achieved at from 0.05 wt % to 1.0 wt %, with best results achieved at from 0.2 wt % and 0.4 wt %.

What is claimed is:

1. A fluid dispensing system for ink-jet printing, comprising:
    (a) an ink-jet ink including (i) from 0.1 wt % to 6 wt % of colorant consisting of anionic dye, and (ii) from 0.05 wt % to 1.0 wt % of an anionic dispersant polymer, and
    (b) a fixer composition including a cationic crashing agent that is reactive with a component of the ink-jet ink,
said fluid dispensing system configured for overprinting or underprinting the fixer composition with respect to the ink-jet ink.

2. A fluid dispensing system as in claim 1, wherein the dispensing system further includes ink-jet ink printing nozzles for printing the ink-jet ink and fixer printing nozzles for printing the fixer composition, and wherein the anionic dispersant is present in the ink-jet ink at an amount that inhibits crashing from occurring at the ink-jet ink printing nozzles.

3. A fluid dispensing system as in claim 2, wherein the ink-jet printing nozzles and the fixer printing nozzles are present on a common nozzle plate.

4. A fluid dispensing system as in claim 2, wherein the ink-jet printing nozzles and the fixer printing nozzles are configured in a proximity such that, upon jetting, small amounts of fixer composition aerosol jetted from the fixer printing nozzles contact the ink-jet ink printing nozzles, thereby resulting in the ink jet printing nozzles being susceptible to cross-contamination by the fixer composition.

5. A fluid dispensing system as in claim 2, wherein the ink-jet printing nozzles and the fixer printing nozzles are serviced by a common wiper.

6. A fluid dispensing system as in claim 2, wherein the ink jet ink and the fixer composition are present in two separate ink-jet pens.

7. A fluid dispensing system as in claim 2, wherein the ink jet ink and the fixer composition are present in two separate reservoirs of a common ink-jet pen.

8. A fluid dispensing system as in claim 1, wherein the cationic crashing agent is present in the fixer composition at from 1 wt % to 5 wt %.

9. A fluid dispensing system as in claim 1, wherein the anionic dispersant polymer is a copolymer that includes both a hydrophobic group and an anionic group.

10. A fluid dispensing system as in claim 1, wherein the anionic dispersant polymer has a weight average molecular weight from 4,000 Mw to 50,000 Mw.

11. A fluid dispensing system as in claim 1, wherein the crashing agent is selected from the group consisting of cationic polymers, multivalent metal ions or ionic groups, acids, and combinations thereof.

12. A fluid dispensing system as in claim 11, wherein the crashing agent is a cationic polymer selected from the group consisting of polyvinylpyridines, polyalkylaminoethyl acrylates, polyalkylaminoethyl methacrylates, poly(vinyl imidazole), polyethyleneimines, polybiguanides, polyguanides, polyvinylamines, polyallylamines, polyacrylamines, polyacrylamides, polyquaternaryamines, cationic polyurathenes, aminecelluloses, polysacchride amines, and combinations thereof.

13. A fluid dispensing system as in claim 11, wherein the crashing agent is a multivalent metal ion provided by a member selected from the group consisting of multivalent metal nitrate salts, EDTA salts, phosphonium halide salts, organic acid salts, chloride salts, and combinations thereof.

14. A fluid dispensing system as in claim 11, wherein the crashing agent is an acid selected from the group consisting of succinic acid, glycolic acid, citric acid, nitric acid, hydrochloric acid, phosphoric acid, sulfuric acid, polyacrylic acid, acetic acid, malonic acid, maleic acid, ascorbic acid, glutaric acid, fumaric acid, tartaric acid, lactic acid, nitrous acid, boric acid, carbonic acid, carboxylic acids such as formic acid, chloro acetic acid, dichloroacetic acid, trichloroacetic acid, fluoroacetic acid, trimethylacetic acid, methoxyacetic acid, mercaptoacetic acid, propionic acid, butyric acid, valeric acid, caprioc acid, caprylic acid, capric acid, lauric acid, myristic acid, palmitic acid, stearic acid, oleic acid, rinolic acid, rinoleic acid, cyclohexanecarboxylic acid, phenylacetic acid, benzoic acid, o-toluic acid, m-toluic acid, p-toluic acid, o-chlorobenzoic acid, m-chlorobenzoic acid, p-chlorobenzoic acid, o-bromobenzoic acid, m-bromobenzoic acid, p-bromobenzoic acid, o-nitrobenzoic acid, m-nitrobenzoic acid, p-nitrobenzoic acid, oxalic acid, adipic acid, phthalic acid, isophthalic acid, terephthalic acid, salicylic acid, p-hydrobenzoic acid, anthranilic acid, m-aminobenzoic acid, p-aminobenzoic acid, benzenesulfonic acid, methylbenzenesulfonic acid, ethylbenzenesulfonic acid, dodecylbenzenesulfonic acid, 5-sulfosalicylic acid, 1-sulfonaphthalene, hexanesulfonic acid, octanesulfonic acid, dodecanesulfonic acid, amino acids such as glycine, alanine, valine, α-aminobutyric acid, α-aminobutryic acid, α-alanine, taurine, serine, α-amino-n-caprioc acid, leucine, norleucine, phenylalanine, and combinations thereof.

15. A method of ink-jet imaging, comprising:
(a) jetting an ink-jet ink from ink-jet printing nozzles, said ink jet ink including (i) from 0.1 wt % to 6 wt % of colorant consisting of anionic dye, and (ii) from 0.05 wt % to 1.0 wt % of an anionic dispersant polymer, and (b) jetting a fixer composition from fixer printing nozzles, wherein the fixer composition is overprinted or underprinted with respect to the ink-jet ink, said fixer composition including a cationic crashing agent reactive with a component of the ink-jet ink.

16. A method as in claim 15, wherein the anionic dispersant is present in the ink-jet ink at an amount that inhibits crashing from occurring at the ink-jet ink printing nozzles.

17. A method as in claim 16, wherein the ink-jet printing nozzles and the fixer printing nozzles are present on a common nozzle plate.

18. A method as in claim 16, wherein the ink-jet printing nozzles and the fixer printing nozzles are configured in a proximity such that, upon jetting, the ink-jet ink printing nozzles are susceptible to contamination from small amounts of fixer composition aerosol jetted from the fixer printing nozzles.

19. A method as in claim 16, wherein the ink-jet printing nozzles and the fixer printing nozzles are serviced by a common cleaning system.

20. A method as in claim 15, wherein the ink-jet ink and the fixer composition are present in two separate ink jet pens.

21. A method as in claim 15, wherein the ink-jet ink and the fixer composition are present in two separate reservoirs of a common ink-jet pen.

22. A method as in claim 15, wherein the cationic crashing agent is present in the fixer composition at from 1 wt % to 5 wt %.

23. A method as in claim 15, wherein the anionic dispersant polymer is a copolymer that includes both a hydrophobic and an anionic group.

24. A method as in claim 15, wherein the anionic dispersant polymer has a weight average molecular weight from 4,000 to 50,000 Mw.

25. A method as in claim 15, wherein the crashing agent is selected from the group consisting of cationic polymers, multivalent metal ions or ionic groups, acids, and combinations thereof.

26. A method as in claim 25, wherein the crashing agent is a cationic polymer selected from the group consisting of polyvinylpyridines, polyalkylaminoethyl acrylates, polyalkylaminoethyl methacrylates, poly(vinyl imidazole), polyethyleneimines, polybiguanides, polyguanides, polyvinylamines, polyallylamines, polyacrylamines, polyacrylamides, polyquaternaryamines, cationic polyurathenes, aminecelluloses, polysacchride amines, and combinations thereof.

27. A method as in claim 25, wherein the crashing agent is a multivalent metal ion provided by a member selected from the group consisting of multivalent metal nitrate salts, EDTA salts, phosphonium halide salts, organic acid salts, chloride salts, and combinations thereof.

28. A method as in claim 25, wherein the crashing agent is an acid selected from the group consisting of succinic acid, glycolic acid, citric acid, nitric acid, hydrochloric acid, phosphoric acid, sulfuric acid, polyacrylic acid, acetic acid, malonic acid, maleic acid, ascorbic acid, glutaric acid, fumaric acid, tartaric acid, lactic acid, nitrous acid, boric acid, carbonic acid, carboxylic acids such as formic acid, chloroacetic acid, dichloroacetic acid, trichloroacetic acid, fluoroacetic acid, trimethylacetic acid, methoxyacetic acid, mercaptoacetic acid, propionic acid, butyric acid, valeric acid, caprioc acid, caprylic acid, capric acid, lauric acid, myristic acid, palmitic acid, stearic acid, oleic acid, rinolic acid, rinoleic acid, cyclohexanecarboxylic acid, phenylacetic acid, benzoic acid, o-toluic acid, m-toluic acid, p-toluic acid, o-chlorobenzoic acid, m-chlorobenzoic acid, p-chlorobenzoic acid, o-bromobenzoic acid, m-bromobenzoic acid, p-bromobenzoic acid, o-nitrobenzoic acid, m-nitrobenzoic acid, p-nitrobenzoic acid, oxalic acid, adipic acid, phthalic acid, isophthalic acid, terephthalic acid, salicylic acid, p-hydrobenzoic acid, anthranilic acid, m-aminobenzoic acid, p-aminobenzoic acid, benzenesulfonic acid, methylbenzenesulfonic acid, ethylbenzenesulfonic acid, dodecylbenzenesulfonic acid, 5-sulfosalicylic acid, 1-sulfonaphthalene, hexanesulfonic acid, octanesulfonic acid, dodecanesulfonic acid, amino acids such as glycine, alanine, valine, α-aminobutyric acid, α-aminobutryic acid, α-alanine, taurine, serine, α-amino-n-caprioc acid, leucine, norleucine, phenylalanine, and combinations thereof.

* * * * *

UNITED STATES PATENT AND TRADEMARK OFFICE
CERTIFICATE OF CORRECTION

PATENT NO. : 8,777,390 B2
APPLICATION NO. : 10/825736
DATED : July 15, 2014
INVENTOR(S) : Paul Bruinsma et al.

It is certified that error appears in the above-identified patent and that said Letters Patent is hereby corrected as shown below:

In the Claims,

In column 12, line 63, in Claim 4, delete "ink jet" and insert -- ink-jet --, therefor.

In column 13, lines 1-2, in Claim 6, delete "ink jet" and insert -- ink-jet --, therefor.

In column 13, lines 4-5, in Claim 7, delete "ink jet" and insert -- ink-jet --, therefor.

In column 13, line 27, in Claim 12, delete "polyurathenes," and insert -- polyurethanes, --, therefor.

In column 13, line 28, in Claim 12, delete "polysacchride" and insert -- polysaccharide --, therefor.

In column 13, line 42, in Claim 14, delete "chloro acetic" and insert -- chloroacetic --, therefor.

In column 13, line 45, in Claim 14, delete "caprioc" and insert -- caproic --, therefor.

In column 13, line 47, in Claim 14, delete "rinoleic" and insert -- ricinoleic --, therefor.

In column 13, line 60, in Claim 14, after "acid," delete "α-aminobutryic acid,".

In column 13, line 61, in Claim 14, delete "n-caprioc" and insert -- n-caproic --, therefor.

In column 13, line 65, in Claim 15, delete "ink jet" and insert -- ink-jet --, therefor.

In column 14, line 22, in Claim 20, delete "ink jet" and insert -- ink-jet --, therefor.

In column 14, lines 45-46, in Claim 26, delete "polyurathenes," and insert -- polyurethanes, --, therefor.

Signed and Sealed this
Sixth Day of January, 2015

Michelle K. Lee
*Deputy Director of the United States Patent and Trademark Office*

CERTIFICATE OF CORRECTION (continued)
U.S. Pat. No. 8,777,390 B2

In column 14, line 46, in Claim 26, delete "polysacchride" and insert -- polysaccharide --, therefor.

In column 14, line 62, in Claim 28, delete "caprioc" and insert -- caproic --, therefor.

In column 14, line 64, in Claim 28, delete "rinoleic" and insert -- ricinoleic --, therefor.

In column 15, lines 10-11, in Claim 28, after "acid," delete "α-aminobutryic acid,".

In column 15, line 11, in Claim 28, delete "n-caprioc" and insert -- n-caproic --, therefor.